(12) United States Patent
Park et al.

(10) Patent No.: US 9,578,539 B1
(45) Date of Patent: Feb. 21, 2017

(54) TRANSMITTING A DATA PACKET OVER A WIRELESS COMMUNICATION LINK

(71) Applicant: Sprint Spectrum LP, Overland Park, KS (US)

(72) Inventors: Sungki Park, Ashburn, VA (US); Saied Kazeminejad, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 259 days.

(21) Appl. No.: 13/947,001

(22) Filed: Jul. 19, 2013

(51) Int. Cl.
*H04W 28/02* (2009.01)

(52) U.S. Cl.
CPC ................. *H04W 28/0236* (2013.01)

(58) Field of Classification Search
CPC .................................. H04W 28/0236
See application file for complete search history.

(56) References Cited

U.S. PATENT DOCUMENTS

| | | | | |
|---|---|---|---|---|
| 7,502,310 B2 * | 3/2009 | Hwang | ................... | H04L 5/023 370/208 |
| 7,526,035 B2 * | 4/2009 | Suh | ....................... | H04L 1/0001 375/132 |
| 7,574,179 B2 * | 8/2009 | Barak et al. | ................... | 455/101 |
| 7,620,370 B2 * | 11/2009 | Barak et al. | ................ | 455/67.13 |
| 7,649,831 B2 * | 1/2010 | Van Rensburg | ..... | H04B 7/0639 370/203 |
| 8,040,912 B2 * | 10/2011 | Imamura et al. | ............. | 370/437 |
| 8,175,539 B2 * | 5/2012 | Diener | .................. | H04L 1/0001 370/318 |
| 8,265,566 B2 * | 9/2012 | Golitschek | ............ | H04L 1/0026 370/241 |
| 8,457,235 B2 * | 6/2013 | Ko | ....................... | H04B 7/0413 375/267 |
| 8,498,639 B2 * | 7/2013 | Chen et al. | .................... | 455/434 |
| 8,526,389 B2 * | 9/2013 | Dinan | ................. | H04W 52/281 370/329 |
| 8,537,801 B2 * | 9/2013 | Calvanese Strinati et al. | ............................. | 370/344 |
| 8,605,610 B2 * | 12/2013 | Hwang et al. | ................. | 370/252 |
| 8,687,541 B2 * | 4/2014 | Lohr | ..................... | H04L 5/0007 370/318 |
| 8,687,555 B2 * | 4/2014 | Ko | ........................ | H04L 1/0026 370/328 |
| 8,792,834 B2 * | 7/2014 | Golitschek Edler Von Elbwart | | H04L 1/0026 455/67.11 |
| 8,811,322 B2 * | 8/2014 | Feuersanger | ......... | H04L 5/0007 370/329 |
| 8,843,070 B2 * | 9/2014 | Liu | ..................... | H04W 52/346 455/63.1 |
| 8,849,216 B2 * | 9/2014 | Baligh et al. | .................... | 455/69 |
| 8,873,485 B2 * | 10/2014 | Nakashima | ........... | H04W 52/42 370/329 |
| 8,897,162 B2 * | 11/2014 | Lv | ......................... | H04W 24/10 370/252 |

(Continued)

*Primary Examiner* — Gregory Sefcheck (57) ABSTRACT

In systems and methods of transmitting a data packet to a wireless device over a wireless communication link, a signal level is received of a wireless communication link between a wireless device and an access node. A data packet is divided into a first segment and a second segment according to the received signal level, and the first segment and the second segment are transmitted to the wireless device over the wireless communication link according to the signal level.

16 Claims, 7 Drawing Sheets

(56) References Cited

U.S. PATENT DOCUMENTS

| | | | | |
|---|---|---|---|---|
| 8,897,248 B2 * | 11/2014 | Dinan | H04W 52/281 | 370/329 |
| 8,989,069 B2 * | 3/2015 | Xu et al. | | 370/311 |
| 9,008,050 B2 * | 4/2015 | Feuersanger | H04W 52/281 | 370/336 |
| 9,036,511 B2 * | 5/2015 | Papasakellariou | H04J 13/00 | 370/276 |
| 9,048,973 B2 * | 6/2015 | Yamamoto | H04J 11/0056 | |
| 9,131,385 B2 * | 9/2015 | Rubin | H04W 16/26 | |
| 9,246,646 B2 * | 1/2016 | Pelletier | H04B 7/0678 | |
| 9,258,092 B2 * | 2/2016 | Heo | H04L 5/001 | |
| 9,288,024 B2 * | 3/2016 | Novak | H04L 5/0007 | |
| 2007/0213070 A1 * | 9/2007 | Kim | H04L 1/0003 | 455/452.2 |
| 2010/0183086 A1 * | 7/2010 | Ko | H04B 7/0413 | 375/260 |
| 2011/0103247 A1 * | 5/2011 | Chen et al. | | 370/252 |
| 2012/0218962 A1 * | 8/2012 | Kishiyama et al. | | 370/329 |
| 2012/0307757 A1 * | 12/2012 | Edler Von Elbwart et al. | | 370/329 |
| 2012/0320778 A1 * | 12/2012 | Lv | H04W 24/10 | 370/252 |
| 2013/0121312 A1 * | 5/2013 | Roman et al. | | 370/335 |
| 2013/0242769 A1 * | 9/2013 | Hammarwall et al. | | 370/252 |
| 2014/0307652 A1 * | 10/2014 | Zhang | H04W 52/325 | 370/329 |
| 2014/0317241 A1 * | 10/2014 | Zhao | H04L 65/608 | 709/219 |
| 2016/0050632 A1 * | 2/2016 | Falahati | H04L 5/0055 | 370/329 |

\* cited by examiner

TRANSMITTING A DATA PACKET OVER A WIRELESS COMMUNICATION LINK

TECHNICAL BACKGROUND

Communication over a wireless communication link can be affected by wireless link conditions, including a signal level, radio frequency interference, multipath interference, and the like. Wireless communication can also be affected by the availability of wireless link resources, which diminish as demand and resultant network congestion increases. Evaluation of wireless link conditions and efficient use of available wireless link resource are vitally important in wireless communication systems.

OVERVIEW

In an embodiment, a signal level is received of a wireless communication link between a wireless device and an access node. A data packet is divided into a first segment and a second segment according to the received signal level. The first segment and the second segment are transmitted to the wireless device over the wireless communication link according to the signal level.

DETAILED DESCRIPTION

Figure 1:
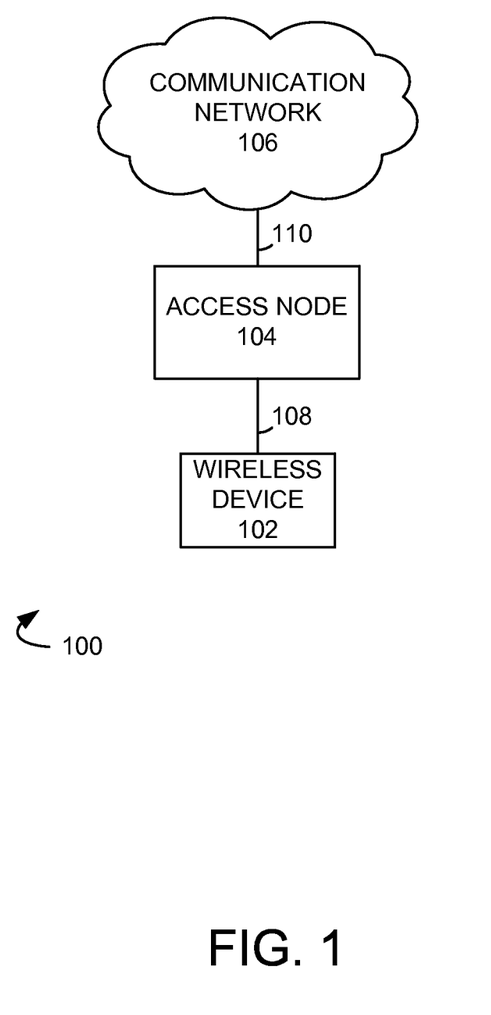
FIG. 1 illustrates an exemplary communication system for transmitting a data packet to a wireless device over a wireless communication link.

FIG. 1 illustrates an exemplary communication system 100 for transmitting a data packet to a wireless device over a wireless communication link comprising wireless device 102, access node 104 and communication network 106. Examples of wireless device 102 can comprise a cell phone, a smart phone, a computing platform such as a laptop, palmtop, or tablet, a personal digital assistant, or an internet access device, including combinations thereof. Wireless device 102 is in communication with access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108 and 110 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Communication over a wireless communication link (such as wireless communication link 108) can be affected by wireless link conditions, including a signal level, radio frequency interference, multipath interference, and the like. Wireless communication can also be affected by the availability of wireless link resources, which diminish as demand and resultant network congestion increases. Thus, evaluating wireless link conditions and efficiently using available wireless link resource are vitally important in wireless communication systems.

In operation, a signal level is received from wireless device 102 of wireless communication link 108. A data packet is divided into a first segment and a second segment according to the signal level. In an embodiment, the data packet can be divided at access node 104. The first segment and the second segment are transmitted from access node 104 to wireless device 102 over wireless communication link 108 according to the signal level.

Figure 2:
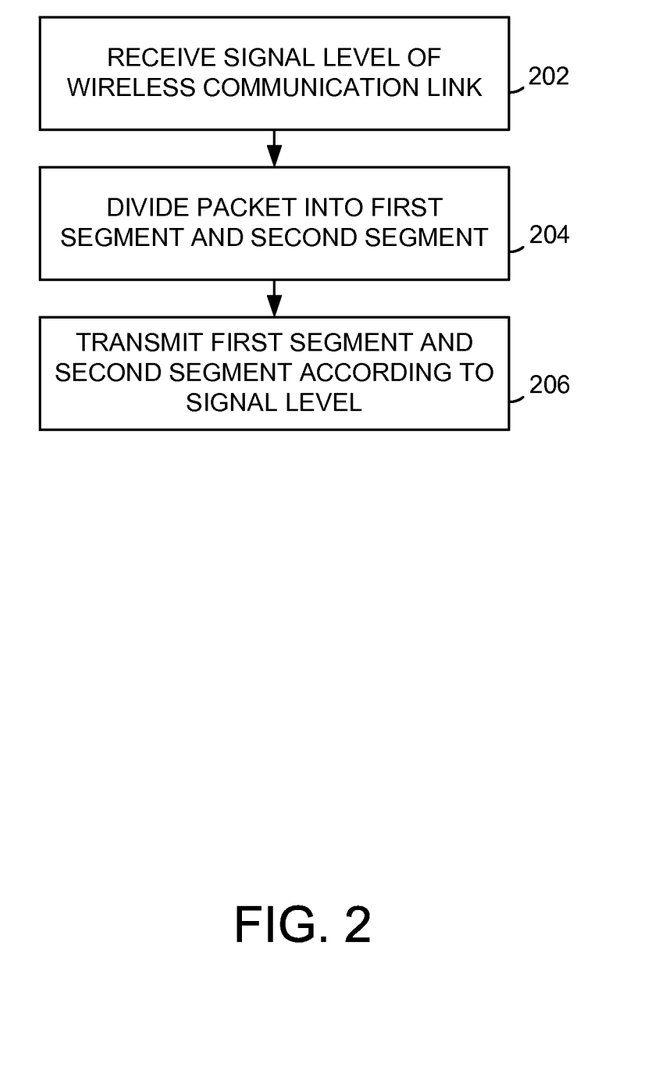
FIG. 2 illustrates an exemplary method of transmitting a data packet to a wireless device over a wireless communication link.

FIG. 2 illustrates an exemplary method of transmitting a data packet to a wireless device over a wireless communication link. In operation 202, a signal level is received of the wireless communication link. For example, a signal level of communication link 108 can be received, for example, at access node 104 from wireless device 102. A signal level can comprise, for example, a signal strength measurement, such as a reference signal received power (RSRP), a signal to noise ratio (SNR), a signal to interference plus noise ratio (SINR), a carrier to interference plus noise ratio (CINR), and the like. A signal level can also comprise, for example, a signal quality measurement, such as a reference signal received quality (RSRQ) and similar signal quality determinations. The bandwidth of a communication link can be divided into sub-bands. In an embodiment, the signal level comprises a first sub-band signal level of a first sub-band of communication link 108, and a second sub-band signal level of a second sub-band of communication link 108. In an embodiment, the first and second sub-band signal levels indicate that the first sub-band comprises a higher signal level than the second sub-band. In an uplink portion of communication link 108, the first and second sub-band signal levels can be received in a channel quality indicator (CQI) or other similar indicator. In a downlink portion of communication link 108, the first and second sub-band signal levels can be determined using a sounding reference signal (SRS) or a similar message to determine the quality of the uplink portion of communication link 108.

Figure 3A:
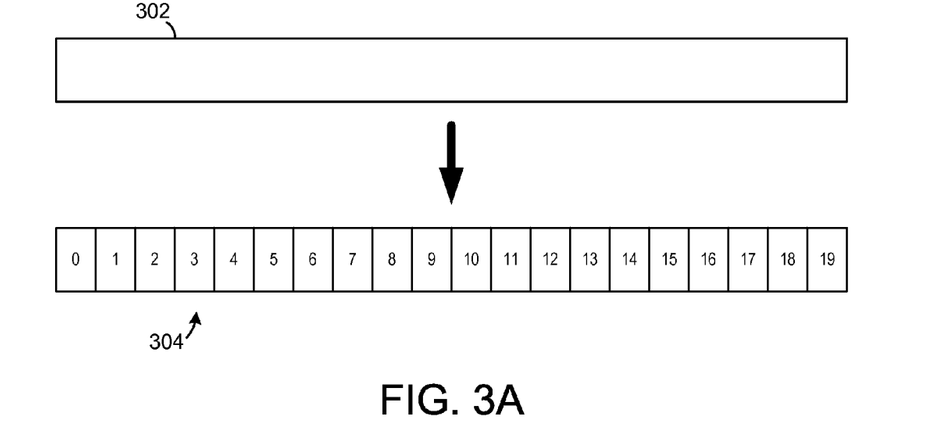
FIGS. 3A and 3B illustrate exemplary data packets and segments.
Figure 3B:
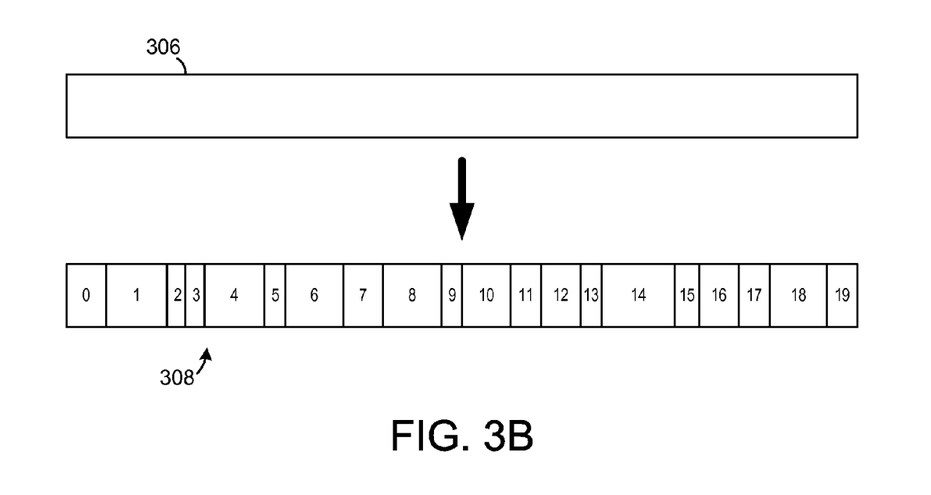

In operation 204, a data packet is divided into a first segment and a second segment according to the signal level. For example, referring to FIG. 3A, exemplary data packet 302 can be divided into twenty segments 304, illustrated as segments 304-0 through 304-19. In an embodiment, the first segment is larger than the second segment. For example, referring to FIG. 3B, exemplary data packet 306 can be divided into twenty segments 308, illustrated as segments 308-0 through 308-19, and which are further illustrated as comprising different sizes. For example, segment 308-0 is smaller than segment 308-1, segment 308-1 is larger than segment 308-2, and so forth. In an embodiment, the data packet is divided at access node 104.

The physical resources in a downlink portion of communication link 108 can be described by a time-frequency grid, such as a resource grid, which can illustrate the mapping of physical resources to resource elements. The time-frequency grid can illustrate correspondences to symbols and sub-carriers. For example, each column and each row of a resource grid can correspond to one symbol (such as an OFDM symbol) and one sub-carrier (such as an OFDM sub-carrier), respectively. The time domain illustration of the resource grid can correspond to, for example, one slot in a frame. The smallest time-frequency unit illustrated in the resource grid can correspond to a resource element. Resource elements can be grouped into resource blocks, which illustrate the mapping of certain physical channels to resource elements. In an embodiment, the minimum size of a resource block corresponds to a minimum number of transmission time intervals (TTIs) in the time domain.

Returning to FIG. 2, the first segment and the second segment are transmitted to the wireless device over the wireless communication link according to the signal level (operation 206). In an embodiment, the first segment is larger than the second segment, the first segment is transmitted over the first sub-band, and the second segment over the second sub-band. For example, when the first sub-band is determined to comprise a higher signal level than the second sub-band, the larger first segment can be transmitted over the first sub-band, and the smaller second segment can be transmitted over the second sub-band.

In an embodiment, a minimum data rate requirement can be determined for the wireless device, and a first segment transmit power and a second segment transmit power can be determined to meet the minimum data rate requirement. The minimum data rate requirement can comprise a minimum data rate, a maximum permitted data delay, a minimum throughput, a maximum error rate, a maximum data loss rate, and the like. The minimum data rate requirement can be based on an application running on the wireless device. The first segment can be transmitted using the first segment transmit power and the second segment can be transmitted using the second segment transmit power.

In an embodiment, a link budget can be determined for the wireless communication link (e.g., wireless communication link 108), and a first segment transmit power and a second segment transmit power can be determined to meet the minimum data rate requirement within the link budget. A link budget comprises an accounting of gains and losses from an access node over a wireless communication link. For example, a link budget of access node 104 can account for conditions of communication link 108. Among other things, the link budget can be affected by receiver sensitivity and the data rate of information transmission over a wireless communication link. The link budget can also differ based on the radio access technology and/or data format used. For example, the link budget for 1×RTT is greater than for LTE, although achievable data rates in LTE are typically greater than those achievable in 1×RTT. Within a given link budget, determining a first segment transmit power and a second segment transmit power can allow the adjustment of transmission power at the level of the segments, providing more granular control of transmission power within the link budget.

Figure 4:
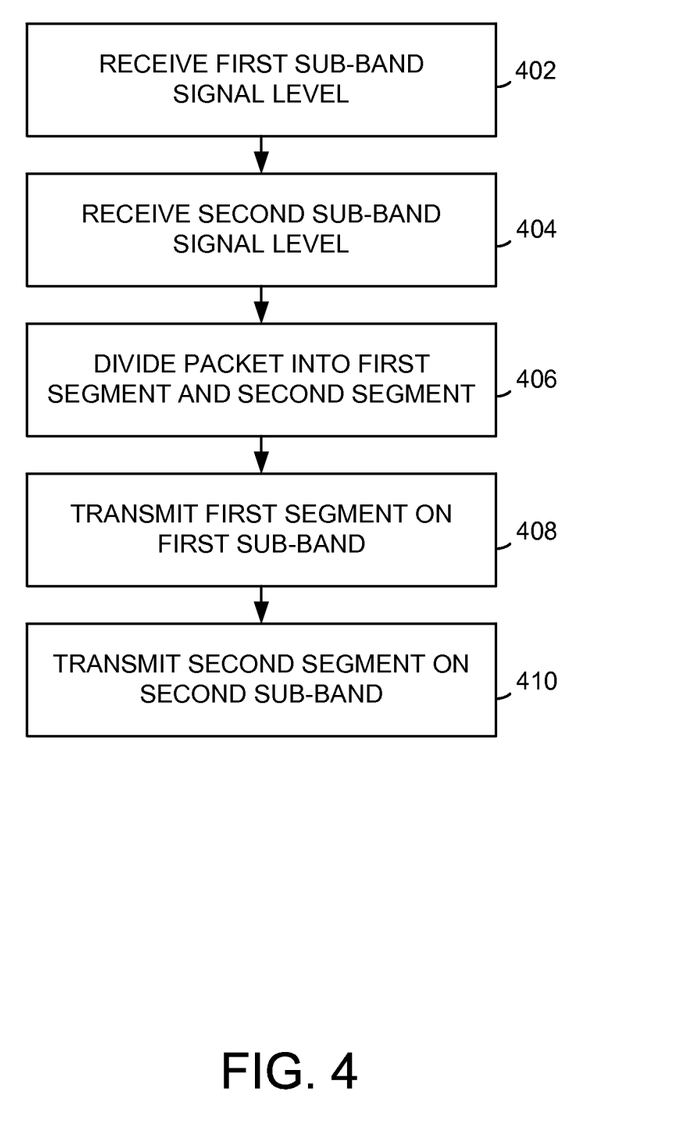
FIG. 4 illustrates another exemplary method of transmitting a data packet to a wireless device over a wireless communication link

FIG. 4 illustrates another exemplary method of transmitting a data packet to a wireless device over a wireless communication link. A first sub-band signal level is received (operation 402), and a second sub-band signal level is received (operation 404). For example, a first sub-band signal level of a first sub-band of communication link 108, and second sub-band signal level of a second sub-band of communication link 108, can be received at access node 104 from wireless device 102. A sub-band signal level can comprise, for example, a signal strength measurement, such as a reference signal received power (RSRP), a signal to noise ratio (SNR), a signal to interference plus noise ratio (SINR), a carrier to interference plus noise ratio (CINR), and the like. A sub-band signal level can also comprise, for example, a signal quality measurement, such as a reference signal received quality (RSRQ) and similar signal quality determinations. In an embodiment, the first and second sub-band signal levels indicate that the first sub-band comprises a higher signal level than the second sub-band.

In operation 404, a data packet is divided into a first segment and a second segment according to the signal level. For example, referring to FIG. 3B, exemplary data packet 306 can be divided into twenty segments 308, illustrated as segments 308-0 through 308-19, and which are further illustrated as comprising different sizes. For example, segment 308-0 is smaller than segment 308-1, segment 308-1 is larger than segment 308-2, and so forth. In an embodiment, the data packet is divided into a first segment and a second segment according to the first and second sub-band signal levels, wherein the first segment is larger than the second segment. As another example, in an embodiment, the data packet is divided into a first segment and a second segment according to the first and second sub-band signal levels, wherein the first segment is larger than the second segment, and wherein the first and second sub-band signal levels indicate that the first sub-band comprises a higher signal level than the second sub-band.

Returning to FIG. 4, the first segment is transmitted to the wireless device on the first sub-band (operation 408), and the second segment is transmitted to the wireless device over the second sub-band (operation 410), according to the first sub-band signal level and the second sub-band signal level. For example, when the first sub-band is determined to comprise a higher signal level than the second sub-band, the larger first segment can be transmitted over the first sub-band, and the smaller second segment can be transmitted over the second sub-band.

Figure 5:
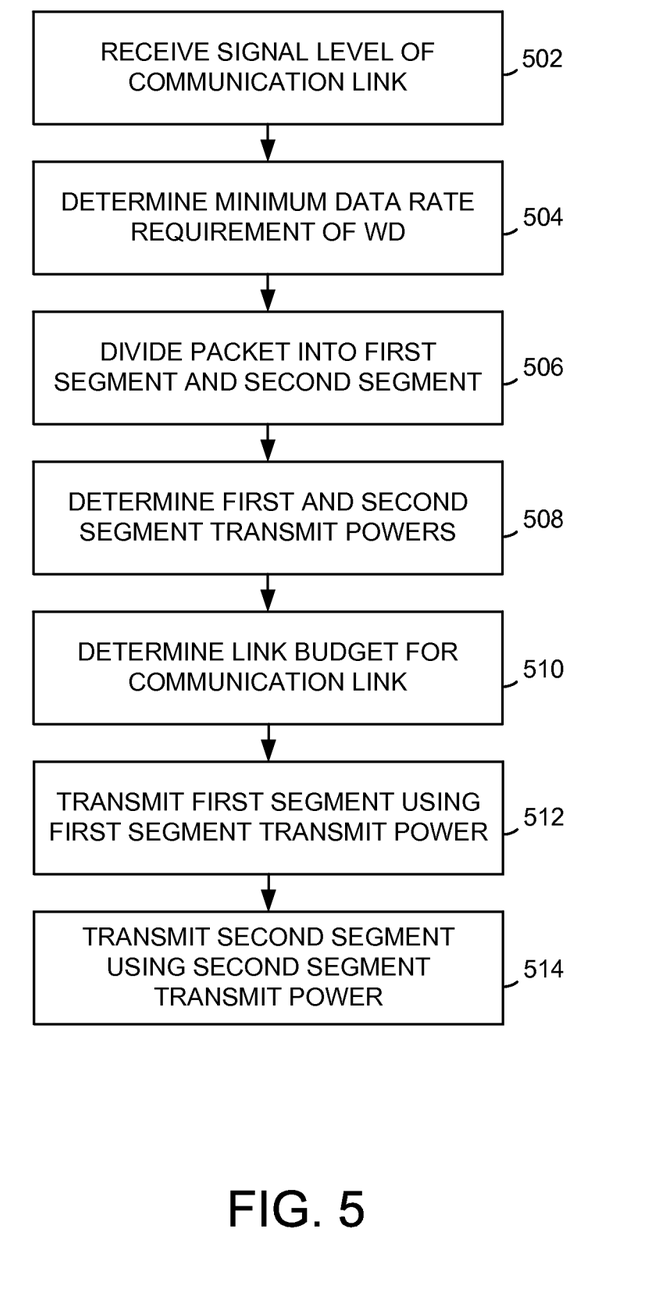
FIG. 5 illustrates another exemplary method of transmitting a data packet to a wireless device over a wireless communication link.

FIG. 5 illustrates another exemplary method of transmitting a data packet to a wireless device over a wireless communication link. A signal level is received of the wireless communication link (operation 502). For example, a signal level of communication link 108 can be received, for example, at access node 104 from wireless device 102. A signal level can comprise, for example, a signal strength measurement, such as a reference signal received power (RSRP), a signal to noise ratio (SNR), a signal to interference plus noise ratio (SINR), a carrier to interference plus noise ratio (CINR), and the like. A signal level can also comprise, for example, a signal quality measurement, such as a reference signal received quality (RSRQ) and similar signal quality determinations.

In operation 504, a minimum data rate requirement is determined for the wireless device. For example, a minimum data rate requirement can be determined for wireless device 102. The minimum data rate requirement can comprise a minimum data rate, a maximum permitted data delay, a minimum throughput, a maximum error rate, a maximum data loss rate, and the like. The minimum data rate requirement can be based on an application running on the wireless device.

Figure 6:
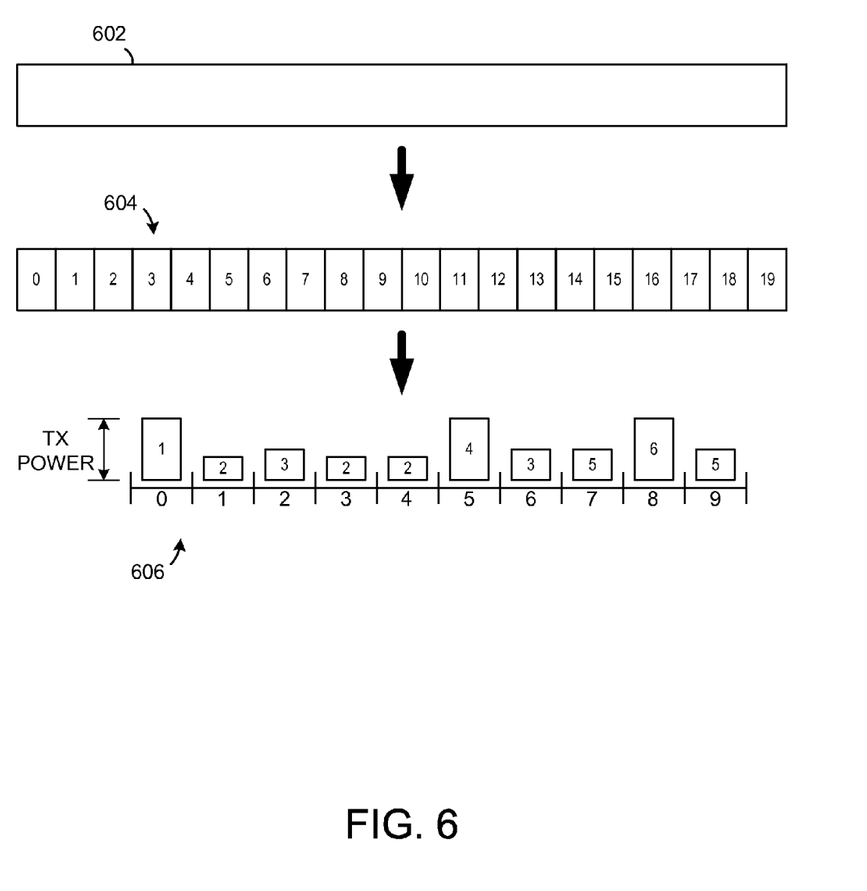
FIG. 6 illustrates an exemplary data packet and segments.

A data packet is divided into a first segment and a second segment (operation 506). For example, referring to FIG. 6, exemplary data packet 602 can be divided into twenty segments 604, illustrated as segments 0-19. When the data packet is divided, a first segment transmit power and a second segment transmit power can be determined to meet the minimum data rate requirement (operation 508). In an embodiment, a link budget can be determined for wireless communication link 108, and a first segment transmit power and a second segment transmit power can be determined to meet the minimum data rate requirement within the link budget. A link budget comprises an accounting of gains and losses from an access node over a wireless communication link. For example, a link budget of access node 104 can account for conditions of communication link 108.

In operation 514, the first segment is transmitted using the first segment transmit power and the second segment is transmitted using the second segment transmit power. For example, the first segment can be transmitted to from access node 104 to wireless device 102 using the first segment transmit power, and the second segment can be transmitted from access node 104 to wireless device 102 using the second segment transmit power.

The transmit power of a packet is typically correlated with the minimum data rate requirement. Further, the total transmit power a packet can comprise an aggregation of the transmit power of its segments, which can be correlated with a number of physical resource blocks, or resource elements, required to transmit the packet or segment. Thus, a data rate can be related to the number of resource elements used to transmit the packet or segment. Required transmit power can also be related to packet size. The larger a packet, the more physical resource blocks are required to transmit the packet, and thus more signal power is required to transmit the packet.

In an embodiment, the first segment can be transmitted a plurality of times, wherein an aggregate transmit power of the transmitting the first segment the plurality of times meets the first segment transmit power. For example, the first segment can be transmitted a plurality of times over communication link 108 from access node 104 to wireless device 102, such that an aggregate transmission power of the first segment, such as a sum of the transmission power of the multiply transmitted first segment, meets the determined first segment transmit power. In an embodiment, the first segment can be transmitted in a plurality of sub-frames, wherein an aggregate transmit power of the transmitting the first segment in the plurality of sub-frames meets the first segment transmit power. That is, the transmit power of each sub-frame of a segment can be less than the determined transmit power, and the aggregate transmit power of the plurality of sub-frames can meet the first segment transmit power. For example, referring to FIG. 6, segments 604 can be transmitted multiple times, for example, in a plurality of sub-frames 606. Sub-frames 606-1 through 606-9 are illustrated, though the number of sub-frames illustrated is merely exemplary and is not limiting. While segment 604-1 can be transmitted within sub-frame 606-0 at a transmit power (TX power), segment 604-2 may be transmitted in more than one sub-frame. For example, segment 604-2 can be transmitted in three sub-frames, 606-1, 606-3, and 606-4, each at a transmit power which, in the aggregate, meets a determined transmit power for segment 604-2.

Figure 7:
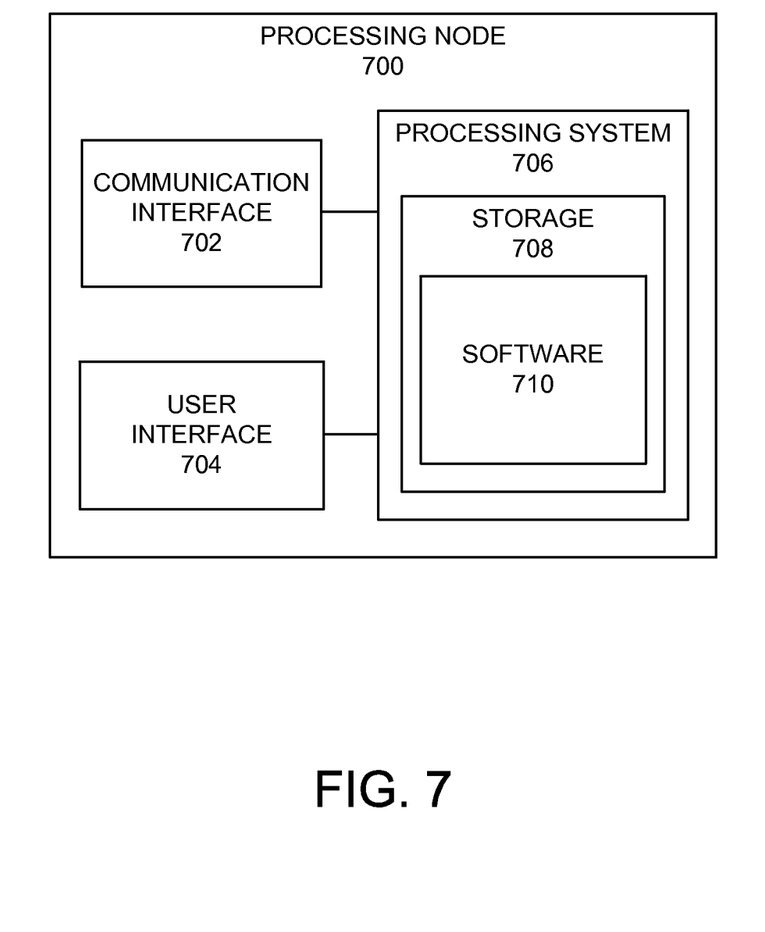
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to perform methods of transmitting a data packet to a wireless device over a wireless communication link. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

An example of processing node 700 includes access node 104. Processing node 700 can also be an adjunct or component of a network element, such as an element of access node 104 or another network element in a communication system. The functionality of processing node 700 can also be distributed over two or more network elements in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of transmitting a data packet to a wireless device over a wireless communication link, comprising:
    receiving a first signal level of a first sub-band of the wireless communication link and a second signal level of a second sub-band of the wireless communication link;
    dividing the data packet into a first segment and a second segment, each of the first and second segments being sized according to the first and second signal level respectively;
    determining a minimum data rate requirement of the wireless device;
    determining a link budget of the wireless communication link based in part on a signal condition of the wireless communication link;
    determining a first segment transmit power to meet the minimum data rate requirement, the first segment transmit power being within the link budget; and
    transmitting the first segment to the wireless device over the wireless communication link using the first segment transmit power;
    wherein the first segment is transmitted in a plurality of sub-frames, and
    wherein an aggregate transmit power of the plurality of sub-frames meets the first segment transmit power.

2. The method of claim 1, wherein the first segment is larger than the second segment.

3. The method of claim 2, further comprising transmitting the first segment over the first sub-band, and the second segment over the second sub-band according to the first sub-band signal level and the second sub-band signal level.

4. The method of claim 3, wherein the first and second sub-band signal levels indicate that the first sub-band comprises a higher signal level than the second sub-band.

5. The method of claim 1, further comprising:
    determining a second segment transmit power to meet the minimum data rate requirement; and
    transmitting the second segment using the second segment transmit power.

6. The method of claim 5, further comprising:
    determining the second segment transmit power to meet the minimum data rate requirement within the link budget.

7. The method of claim 1, further comprising transmitting the first segment a plurality of times, wherein an aggregate transmit power of the transmitting the first segment the plurality of times meets the first segment transmit power.

8. The method of claim 7, further comprising transmitting the first segment in a plurality of sub-frames, wherein an aggregate transmit power of the transmitting the first segment in the plurality of sub-frames time meets the first segment transmit power.

9. The method of claim 1, wherein the minimum data rate requirement is based on an application running on the wireless device.

10. A method of transmitting a data packet to a wireless device over a wireless communication link, comprising:
    receiving a first sub-band signal level and a second sub-band signal level of the wireless communication link;
    dividing the data packet into a first segment and a second segment, each of the first and second segments being sized according to the first sub-band signal level and the second sub-band signal level;
    determining a minimum data rate requirement of the wireless device;
    determining a link budget of the wireless communication link based in part on a signal condition of the wireless communication link;
    determining a first segment transmit power to meet the minimum data rate requirement, the first segment transmit power being within the link budget; and
    transmitting the first segment using the first segment transmit power over a first sub-band, and the second segment over a second sub-band,
    wherein the first segment is transmitted in a plurality of sub-frames, and
    wherein an aggregate transmit power of the plurality of sub-frames meets the first segment transmit power.

11. The method of claim 10, wherein the first segment is larger than the second segment.

12. The method of claim 11, wherein the first and second sub-band signal levels indicate that the first sub-band comprises a higher signal level than the second sub-band.

13. A method of transmitting a data packet to a wireless device over a wireless communication link, comprising:
    receiving a first signal level of a first sub-band of the wireless communication link and a second signal level of a second sub-band of the wireless communication link;
    determining a minimum data rate requirement of the wireless device;

determining a link budget of the wireless communication link based in part on a signal condition of the wireless communication link;

dividing the data packet into a first segment and a second segment, each of the first and second segments being sized according to the first and second signal level respectively;

determining a first segment transmit power and a second segment transmit power to meet the minimum data rate requirement according to the signal level, the first and second segment transmit powers being within the link budget; and transmitting to the wireless device over the wireless communication link the first segment using the first segment transmit power and the second segment using the second segment transmit power, wherein the first segment is transmitted in a plurality of sub-frames, and wherein an aggregate transmit power of the plurality of sub-frames meets the first segment transmit power.

14. The method of claim 13, wherein the minimum data rate requirement is based on an application running on the wireless device.

15. The method of claim 13, further comprising:

determining a second segment transmit power to meet the minimum data rate requirement within the link budget.

16. The method of claim 13, further comprising transmitting the first segment a plurality of times, wherein an aggregate transmit power of the transmitting the first segment the plurality of times meets the first segment transmit power.

* * * * *